March 11, 1958 R. Z. HAGUE ET AL 2,826,069
STUFFING-BOX FOR WATER-METERS
Filed June 5, 1951

INVENTORS
ROBERT Z. HAGUE
EDWIN F. HANTMAN
BY Strauch, Nolan + Diggins
ATTORNEYS United States Patent Office 2,826,069
Patented Mar. 11, 1958

2,826,069

STUFFING-BOX FOR WATER-METERS

Robert Z. Hague, Oradell, N. J., and Edwin F. Hantman, New York, N. Y., assignors to Rockwell Manufacturing Company, Pittsburgh, Pa., a corporation of Pennsylvania Application June 5, 1951, Serial No. 229,926

9 Claims. (Cl. 73—272)

The present invention relates to improvements in fluid flow meters, and more particularly to improvements in sealing devices for preventing leakage of fluid from the fluid flow metering mechanism chamber into the fluid flow registering mechanism chamber of such meters along a spindle drivingly interconnecting these mechanisms through a separating partition of the casing.

The Stuffing Box for Water Meters, disclosed in United States Letters Patent No. 954,621 issued April 12, 1910 to E. E. Gamon, is exemplary of many prior art devices for this purpose; and the disclosed embodiments of the present invention constitute improvements intended preferably for use in the Fluid Meter disclosed in United States Letters Patent No. 2,410,852 issued November 12, 1946, to A. R. Whittaker and the Compound Meter disclosed in United States Letters Patent No. 2,425,720 issued August 19, 1947, to C. P. Bergman.

In meters of these types, a packing assembly which is economical to manufacture, which has long life, which requires little or no servicing, has long been sought for preventing leakage of fluid through the separating casing partition along the spindle interconnecting the flow metering mechanism and the flow registering mechanism. One outstanding difficulty in such prior art devices is that the compression of the sealing element between the relatively rotating parts varies depending upon the manner in which the packing assembly is installed. This produces poor sealing, excessive friction and wear.

It is accordingly a primary object of this invention to provide a packing assembly for a fluid flow meter having these required characteristics.

An equally important object of our invention is the provision in a fluid meter assembly of an improved construction in which leakage of fluid from the fluid filled metering mechanism chamber to the registering mechanism chamber along the spindle drivingly interconnecting these mechanisms is prevented by a stuffing box of improved construction which is economical to manufacture and which functions efficiently over long periods of operation without necessity of part replacement.

A further important object of this invention is to provide a replaceable packing assembly of such construction that the compression of the sealing element against the relatively rotating parts is independent of the manner in which the packing assembly is installed.

It is a further object of this invention to provide packing assemblies of an improved construction which are adapted to be used as replacement parts for the packing assemblies heretofore used in fluid flow meters.

It is a specific object of our invention to provide a packing assembly comprising a packing element of flexible material in the shape of a tore and a housing adapted to be secured to the partition separating the flow metering mechanism and the flow registering mechanism to hold the packing element in fluid tight relation with the spindle interconnecting these mechanisms and with the partition.

These and other objects of this invention will become apparent as the detailed description proceeds in reference to the figures of the accompanying drawing wherein:

Figure 2A is an enlarged sectional view of the packing assembly of Figure 2;

Figure 4A is an enlarged view of the packing assembly of Figure 4.

Figure 1:
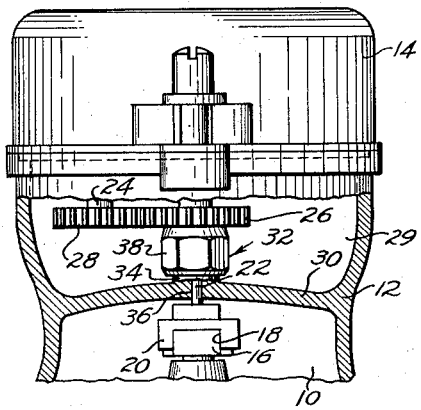
Figure 1 is a fragmentary sectional view of the drive train interconnecting the flow metering mechanisms and the flow registering mechanism of a meter of the type disclosed in the aforesaid Whittaker patent.

In meters of the type disclosed in the Whittaker patent aforesaid, a portion of one of which is shown in Figure 1, the fluid flow metering mechanism is mounted in the lower portion of a water filled chamber 10 formed in the lower part of the meter casing 12 and the registering mechanism (not shown) is located within a casing 14 secured to the top of casing 12. The fluid flow metering mechanism, through intermediate gearing (not shown), causes the key 16 to rotate. Key 16 engages a transverse slot 18 in the bottom of a member 20 which is fixed to the lower end of a spindle 22. The register mechanism of input shaft 24 is driven from the key 16 and spindle 22 through the meshed gears 26 and 28 which are fixed respectively to the spindle 22 and the input shaft 24.

Figure 2:
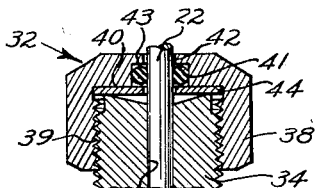
Figure 2 is an enlarged sectional view of the stuffing box assembly of the drive train of Figure 1.

In order to prevent leakage the liquid from metering mechanism chamber 10 into the registering mechanism chamber 29 along the spindle 22 through the partition 30 in the casing 12, a stuffing box assembly 32 is mounted in sealed relation to the partition 30 around the spindle 22. This stuffing box assembly comprises, as is best shown in Figure 2, a post 34 having a longitudinally extending aperture 36 in which the spindle 22 is journalled for rotation, and a packing assembly, shown in Figure 2A, including a cap 38, which serves as a housing for the sealing elements and is fixed over the end of the post 34 by threaded engagement therewith. In this embodiment, post 34 is formed integral with partition 30.

Cap 38 is formed with a first recess having a cylindrical threaded side wall 39 into which post 34 extends, a second recess of smaller cross sectional area formed in the end wall 40 of the first recess in which is mounted sealing element 41 and with an aperture 42 through the end wall 43 of the second recess coaxial with the two recesses and through which the spindle 22 freely extends. Sealing element 41 has the shape of a tore and is formed of a flexible material, preferably rubber. For the purpose we prefer to employ a resilient rubber O-ring of normally circular cross-section. An apertured disk-shaped hard fibre or composition gasket 44 is mounted within the first recess against the end wall 40 thereof. When the packing assembly is mounted on post 34, gasket 44 is interposed between the end wall of the first recess and the end of the post 34 to form a fluid seal therebetween. The sealing element or tore 41 is in annular surface engagement with the cylindrical wall of the second recess and with the rotatable spindle 22 to prevent passage of liquid therealong from the chamber 10. When this assembly is mounted in position on post 34, tore 41 becomes slightly deformed radially from its normal circular cross-section to that shown, being slightly flattened by surface engagement with the cylindrical wall of the second recess and the spindle 22.

As is clearly disclosed in Figure 2, the end face of the post 34 is formed with a conical depression and may be termed cup-shaped. The outer periphery of the cup-shaped end face, in cooperation with the gasket 44 and the end wall of the first recess, constitutes a fluid seal between the cap and the post. The pressure between the cap and the post is thus isolated from the inner portion of the gasket 44, thus no axial pressure can be transferred through the radially inner portion of the gasket 44 to the tore 41, when the cap 38 is tightened on its post.

By this construction, the compression of the tore 41 is determined solely by the diameter of spindle 22 and the cylindrical second recess and is thus completely independent of the degree to which cap 38 is tightened upon post 34. The difficulties resulting from excessive compression of the sealing element in prior art devices are, therefore, completely eliminated.

The outer diameter of gasket 44 is substantially equal to or but slightly less than the root diameter of the threads formed on the side wall 39 of cap 38, and the gasket 44 therefore must be deformed slightly while it is being axially inserted toward end wall 40. Since the threads of the side wall 39 do not extend to the end wall 40 and since the axially short chamber intermediate the end of the threads and the end wall 40 has a diameter substantially equal to that of the thread root diameter, the gasket 44 there returns to its flat shape, as shown, after it is completely inserted. Gasket 44 performs both the function of a retainer for tore 41 before cap 38 is mounted on post 32 and a sealing element therebetween after mounting.

The relative size of the several parts of this assembly produces a packing assembly which may be easily assembled and in which the component parts are retained in their proper relative positions once assembly is completed. The gasket 44 is retained in the bottom of the cap below the threads and thus retains ring 41 against loss. This packing assembly is, therefore, a compact unit which is convenient for use either as a replacement part or in initial assembly of the meter. It will be apparent by comparison of the present structure with the aforesaid Whittaker patent that the packing assembly comprising cap 38, sealing element 41 and gasket 44 may be utilized as a replacement for the packing assembly of the meter as disclosed in the aforesaid Whittaker patent.

Figure 3:
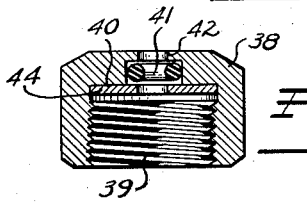
Figure 3 is a fragmentary sectional view of the drive train interconnecting the two flow metering devices with the single fluid flow registering device of a compound meter of the type disclosed in the aforesaid Bergman patent.
Figure 3:
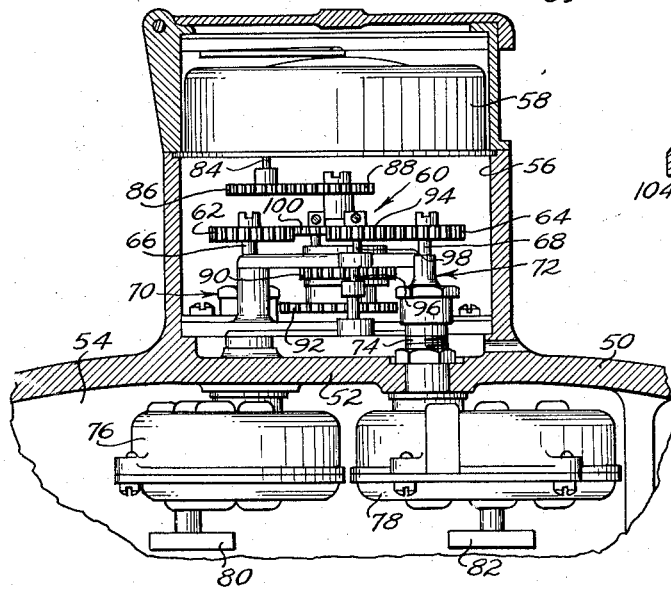

The second embodiment of this invention constitutes an improvement over the Compound meter disclosed in aforesaid Bergman patent, a portion of which is disclosed in Figure 3. In meters of this type, a casing 50, in the lower portion of which is mounted a pair of metering devices, is provided with a partition 52 separating a lower fluid filled chamber 54 from an upper chamber 56 in which a registering mechanism 58 and a compensator mechanism 60 are mounted. Motion is imparted to a compensator mechanism 60 by two input gears 62 and 64, which are fixed respectively to the upper end of a pair of shafts 66 and 68. Shafts 66 and 68 extend through stuffing boxes comprising packing assemblies 70 and 72 and longitudinally apertured posts 74 into the associated gear boxes 76 and 78. Rotation is imparted to the shafts 66 and 68 from dogs 80 and 82 which are driven by the associated metering devices (not shown) through the gear trains within the gear boxes 76 and 78 respectively. The registering mechanism input shaft 84 is driven from the output shaft of the compensator mechanism 60 through meshed gears 86 and 88 fixed respectively to input shaft 84 and the output shaft of the compensator mechanism 60. The compensator mechanism, which is driven by the one of the gears 62 or 64 which tends to drive it faster, comprises a pair of unidirectional clutch means, each adapted to drive the compensator mechanism output shaft in the same direction of rotation. Gear 90, which is fixed to the driving element of one of these clutches, is driven from the gear 64 through gear 94 and pinion 96 which are interconnected by a shaft 98. Gear 92 which is fixed to the driven element of the other of these clutches, is similarly driven from the gear 62 through a gear 100 and a shaft and pinion (not shown). If further details of this mechanism are found to be necessary to complete understanding of the present invention, reference is made to the aforesaid Bergman patent.

As previously indicated, it is with respect to the prevention of the leakage of fluid from the metering mechanism chamber of the meter casing to the registering mechanism chamber through the partition separating these mechanisms along the drive spindles interconnecting the two mechanisms that our present invention is directed.

Figure 4:
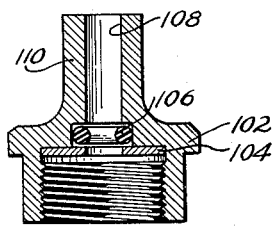
Figure 4 is an enlarged sectional view of one of the two identical stuffing box assemblies of the drive train shown in Figure 3.

In the embodiment of the invention disclosed in Figure 3, post 74 is a separate member fixed externally in sealed engagement with the partition 52, rather than being formed integral therewith as in the first embodiment. As will be noted by reference to Fig. 4A, the illustrated packing assembly 72, which is preferably identical with assembly 70, comprises a cap 102 which is adapted to be mounted over the end of post 74 and fixed thereon by threaded engagement therewith as shown in Figure 4, a gasket 104 which, after mounting, is interposed between the end of the post 74 the end wall of the mating recess in the cap 102, and a sealing element 106 mounted in a recess formed internally of the cap end wall. The spindle 68 extends through the sealing element 106 and aperture 108 formed through the cap 102 coaxial with the recesses therein. Gasket 104 is inserted and retained within cap 102 in the same manner as gasket 44 in the previous embodiment. As in the previous embodiment, the sealing element 106 is formed in the shape of a tore of flexible material, preferably a rubber O-ring, and functions in the same manner as that of the previous embodiment.

The structure of our packing assemblies for use with compound meters differ primarily from the form disclosed in Figures 1, 2 and 2A in that the cap 102 is provided with elongated cylindrical extension 110 surrounding the spindle 68. Cylindrical extension 110 is provided to prevent bending of the spindle 68 in the event that a heavy side load is applied thereto but normally does not function as a bearing for this spindle.

The tore or sealing element 106 is in annular surface contact with the external surface of the spindle 68 and the cylindrical wall of the recess within the cap 102 to define a fluid seal for the spindle 68. It should be noted that packing assembly comprising cap 102, tore 106 and gasket 104 may be used as a replacement part of the prior art packing assemblies in compound meters such as that disclosed in the aforesaid Bergman patent as well as being utilized in new meters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. For use in a fluid flow measuring device having a casing in which a flow metering mechanism and a flow registering mechanism are separated by a partition of said casing and drivingly interconnected by an axially fixed rotatable spindle extending through a longitudinally apertured externally threaded post fixed in liquid tight relation with said partition, a stuffing box for preventing fluid leakage along said spindle comprising: a longitudinally apertured cap having first and second cylindrical recesses formed therein coaxial with the aperture, said first recess being adapted for threaded engagement with said post, said second recess being of smaller cross sectional area than said first recess and formed in the internal face of the cap end wall; a tore of pliable rubber of less thickness than the depth of said second recess, mounted within said second recess, and adapted for annular surface contact with said spindle and the cylindrical wall of said second recess, and a gasket for holding said tore within said second recess and adapted to form a fixed seal between said cap and the post.

2. For a fluid flow measuring device having a casing in which a flow metering mechanism mounted in one end and a flow registering mechanism mounted on a cylindrical extension on the other end are separated by a partition of said casing and drivingly interconnected by a spindle journalled for rotation in an externally threaded post having an end face with a conical depression therein extending from said partition into said cylindrical extension, a unitary fluid sealing device for preventing leakage of fluid from the metering mechanism side of the partition to the registering mechanism side comprising: a longitudinally apertured cap internally threaded for engagement with said post, said cap having an internal cylindrical open ended recess whose diameter is less than the inner diameter of said internal threads formed internally in the end wall thereof concentric with said spindle, a tore of flexible resilient material whose thickness is less than the depth of said recess radially compressed within said recess surrounding said spindle and in annular surface contact with said spindle and the cylindrical wall of said recess, and means in said cap adjacent said end wall adapted to define a fixed fluid seal between said cap and the outer edge of the end face of said post surrounding said conical depression.

3. For a fluid flow measuring device having a casing in which a flow metering mechanism mounted in one end and a flow registering mechanism mounted on a cylindrical extension on the other end are separated by a partition of said casing and drivingly interconnected by a spindle journalled for rotation in an externally threaded post extending from said partition into said cylindrical extension, a unitary fluid sealing device for preventing leakage of fluid from the metering mechanism side of the partition to the registering mechanism side comprising: a cap member for said post having a first substantially cylindrical recess formed therein, the cylindrical wall of said recess being threaded throughout the major portion of its length from the open end of said cap for engagement with the externally threaded post, the remainder of the length of the cylindrical wall of said recess having a diameter substantially equal to the root diameter of the threaded portion thereby forming an axially short chamber between the end wall of the recess and the threads, a second cylindrical recess of smaller diameter than and coaxial with said first recess formed internally in the end wall thereof, an aperture through said cap member coaxially of said recesses adapted to be concentric with said spindle, a tore of flexible resilient material radially compressed within said second recess adapted to surround and be disposed in annular surface contact with said spindle and the cylindrical wall of said second recess, and a centrally apertured gasket having an external diameter substantially equal to the diameter of said short chamber and an internal diameter greater than the diameter of said spindle and mounted within said short chamber and adapted to be sealingly compressed between the end face of said post and the end wall of said cap member.

4. In combination, an externally threaded fixed post having an end face formed with a conical depression, an aperture extending axially through said post, a cap member on said post and having a first substantially cylindrical recess formed therein, a transverse wall at the inner end of said recess, the cylindrical wall of said recess being threaded throughout the major portion of its length from the open end of said cap member and engaged with the externally threaded fixed post, the remainder of the length of the cylindrical wall of said recess having a diameter substantially equal to the root diameter of the threaded portions thereby forming an axially short chamber between the end wall of the recess and the threads, a second open ended recess of smaller diameter than said first recess formed coaxially with the first recess in the end wall internally of the cap member, an aperture through said cap member coaxially of said recesses, a tore shaped sealing element having a free external diameter slightly larger than that of the second recess and an internal diameter after assembly slightly smaller than said cap aperture mounted coaxially with said second recess, and a centrally apertured gasket having an external diameter substantially equal to the diameter of said short chamber and an internal diameter slightly less than the diameter of said second recess but greater than the inner diameter of said tore disposed within said short chamber between the end face of the post and the end wall of the recess.

5. A sub-assembly for a stuffing box comprising a cup shaped member having a first substantially cylindrical recess, a transverse end wall at the inner end of said recess, the cylindrical wall of said recess being threaded from the open end of said cup-shaped member throughout the major portion of its length, the remainder of the length of the cylindrical wall of said recess having a diameter substantially equal to the root diameter of the threaded portion thereby forming an axially short chamber between the end wall of the recess and the threads, a second open ended recess of smaller diameter than said first recess formed coaxially with the first recess in said end wall internally of the cup-shaped member, an aperture through said cup-shaped member coaxially of said recesses, a tore shaped sealing element having a free external diameter slightly larger than that of said second recess and an internal diameter after assembly slightly smaller than the cup aperture mounted coaxially within said second recess, and a centrally apertured gasket having an external diameter substantially equal to the diameter of said short chamber and an internal diameter slightly less than the diameter of said second recess but greater than the inner diameter of said tore disposed within said short chamber.

6. In a stuffing box for a water meter or the like wherein a rotatable spindle is driven from a flow responsive device and extends through a hollow post, a cup shaped body having a threaded bore adapted to coact with threads on the post and being open at one end and closed at the other end by an integral end wall, said end wall having a spindle receiving aperture concentric with the bore and having internally a coaxial cylindrical recess larger than said aperture surrounding the aperture and providing a flat annular radial shoulder at that end of the bore, a resilient ring of circular cross section in said recess adapted to be radially compressed between the spindle and the cylindrical wall of the recess, and a flexible gasket at the inner end of the bore seated on said annular shoulder and adapted to be compressed between the post and the body when the body is threadedly mounted on the post, said gasket having a central opening larger than the spindle diameter and smaller than the recess diameter and said recess being axially larger than the diameter of the circular cross section of said resilient ring, said resilient ring remaining free of axial compression within said recess when said body is threadedly mounted on said post and tightened to compress said gasket.

7. A sub-assembly for a stuffing box comprising in combination: a cap having a first substantially cylindrical recess formed therein, a transverse wall at the inner end of said recess, a second recess coaxial with said first recess and formed in the internal face of the end wall of said cap, and an aperture formed through said cap coaxial with said recesses, the cylindrical wall of said first recess being threaded from the open end of said cap throughout the major portion of its length with an unthreaded remaining portion of said cylindrical wall adjacent the end wall of said cap having a diameter greater than the inner thread diameter of said threaded major portion of said wall; a tore of less thickness than the depth of said second recess, having a free external diameter slightly larger than that of the second recess and an internal diameter after assembly slightly smaller than said aperture, mounted coaxially within said second recess; and an apertured gasket having an outside diameter greater than the inner thread diameter of said threaded major portion of said first recess mounted within said unthreaded portion of said first recess adjacent the end wall thereof.

8. A sub-assembly for preventing leakage of fluid along an axially fixed rotating shaft comprising a cup-shaped member having an enlarged bore open at one end and having a transverse end wall at the other end, a threaded section in said bore, an open ended recess smaller than and coaxial with the bore formed in said end wall and open to said bore, said end wall being apertured in co-alignment with said recess and said bore, a resilient O-ring of less thickness than the depth of said recess disposed in said recess, and an annular gasket retained in said bore adjacent said end wall overlapping said recess to retain the O-ring in the recess and to provide a resilient surface adapted to provide fluid tight contact between the end wall and a mating part.

9. A stuffing box for a water meter comprising: a longitudinally apertured post; an axially fixed rotatable spindle extending coaxially through the aperture of said post; a cup-shaped cap mounted over the end of said post in fluid tight relation therewith and having an aperture coaxially aligned with said post aperture and said spindle, and an open ended axially directed recess formed internally thereof open to the end of said post; a tore of flexible material and of less thickness than the depth of said recess mounted within said recess around said spindle and having, after assembly within said recess and prior to passage of the spindle therethrough, an internal diameter smaller than the diameter of said spindle and, prior to assembly within said recess, an outside diameter larger than the diameter of said recess; said recess being sufficiently deep to permit axial disposition of said flexible tore in said recess without deformation of said tore as a result of the longitudinal position of said cap relative to said post and spindle; and means in said cap defining a fixed fluid seal between said cap and the end of said post.

References Cited in the file of this patent
UNITED STATES PATENTS

| | | |
|---|---|---|
| 129,485 | Mayor | July 16, 1872 |
| 503,884 | Thomson | Aug. 22, 1893 |
| 1,831,903 | Chrisman et al. | Nov. 17, 1931 |
| 2,410,852 | Whittaker | Nov. 12, 1946 |
| 2,425,720 | Bergman | Aug. 19, 1947 |
| 2,471,615 | Gladden | May 31, 1949 |
| 2,535,288 | Honkanen | Dec. 26, 1950 |
| 2,570,117 | Hallstrand | Oct. 2, 1951 |

OTHER REFERENCES

Product Engineering, February 1947, page 291, published by McGraw Hill Publishing Co., New York.